May 30, 1939.  S. RITTER  2,160,316
BRACELET CONNECTOR
Filed Oct. 6, 1934
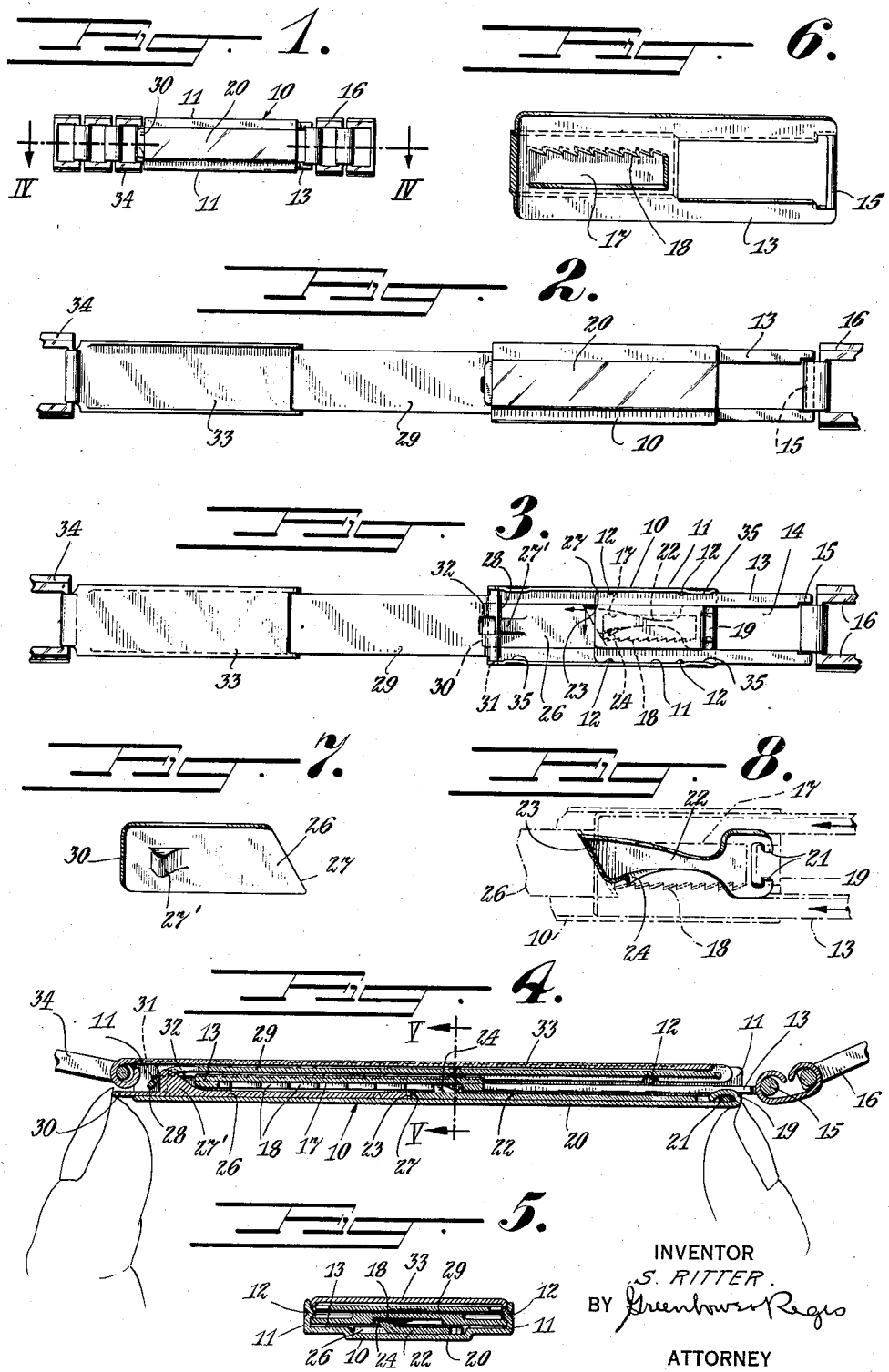
INVENTOR
S. RITTER.
BY Greenhower Regis
ATTORNEY Patented May 30, 1939

2,160,316

UNITED STATES PATENT OFFICE 2,160,316

BRACELET CONNECTOR

Saul Ritter, Far Rockaway, N. Y., assignor, by mesne assignments, to The Hadley Company, Inc., Providence, R. I., a corporation of Rhode Island Application October 6, 1934, Serial No. 747,163

15 Claims. (Cl. 24—71)

This invention relates to adjustable connectors for bracelets such as wrist watch straps or the like and relates more particularly to a connector for joining the ends of two sections of a flexible chain or strap.

Adjustable connectors have heretofore been made in various forms and one type which has gained popularity as being the most desirable, includes a plurality of links hingedly connected so as to fold one upon the other, one of the links serving to support or carry a slidable member. This type of connector is known as the closed ring type and when either open or closed the ring is not broken, thus the watch is always held about the wrist.

In devices as heretofore constructed one of the links cooperated with means on another link to constitute a take-up comprised of a pawl and ratchet. Thus when the foldable links were open the slidable links were free to move relative of each other. When the foldable links were closed the slide links were movable to contract the bracelet or decrease its diameter and the pawl and ratchet held the links against an opposite movement. With this construction it often happened that the wearer, when adjusting the strap to the wrist, would move the adjusting means too much and cause the bracelet to grip the wrist too tightly in which case it was necessary to open the foldable members to release the adjusting means.

Furthermore in the devices as heretofore employed the foldable links were held in a trough shape housing, the side walls of which were provided with protuberances or bosses to engage the links when folded and thus hold them in the housing.

In constructions where the foldable links cooperated with a sliding link to provide an adjustable means, the pressure exerted through the action of this cooperating adjustable arrangement tended to force the folded links out from the housing, to the inconvenience of the wearer.

It is an object of the present invention therefore to provide an improved form of foldable connector for bracelets in which a slide link is so arranged as to be adjustable irrespective of the position of the foldable links.

Another object of the invention is to provide a foldable link construction wherein the diameter of a bracelet may be adjusted by contracting the adjusting means and in which means are provided for releasing the adjusting means to expand the bracelet.

Another object of the invention is to provide a simplified form of bracelet connector in which adjustable securing means is provided and operable by pressure applied endwise to slidable members.

Another object of the invention is to provide a foldable link construction including a pair of slidable members and means operated by relative movement of said members to hold them in different relative positions.

Other objects and advantages of the invention will be more fully understood from the following description together with the accompanying drawing in which, Fig. 1 is a top view of a connector constructed in accordance with the present invention in closed position and showing portions of a bracelet to which the connector is attached.

Fig. 2 is a top view of the connector when open.

Fig. 3 is a bottom view of the connector when open.

Fig. 4 is an enlarged view taken on lines IV—IV in Fig. 1.

Fig. 5 is a view taken on lines V—V in Fig. 4.

Fig. 6 is a detail view of a slidable member including ratchet teeth.

Fig. 7 is a perspective view of a push-bar for releasing a self-acting pawl which engages with the ratchet and Fig. 8 is a perspective view of the self-acting pawl which engages the ratchet teeth shown in dotted lines.

A practical embodiment of the invention may comprise a guide plate 10 having lateral flanges 11 provided with lugs 12 to serve as guides for a slidable plate 13. The plate 13 may have one end provided with a slot terminating in a cross bar 15 to which one section 16 of a chain or bracelet may be attached. This slide plate may be recessed to furnish an elongated cavity 17 (see Fig. 6), one edge of which is formed with ratchet teeth 18.

The guide plate 10, may at one end, be provided with clamping ear 19 to secure lugs 21 at one end of a resilient dog or pawl 22. The pawl may be of spring steel or other flexible material and may be so held as to be self-acting to normally engage with ratchet teeth 18. The guide plate 10 is provided with a trough like recess 20 (see Fig. 5) to receive the pawl. The free end of the pawl is formed with an inclined surface 23 and a raised tooth 24 is normally held in tensional contact with the ratchet teeth 18. The pawl 22 is so disposed as to rest on the inner surface of the guide plate 10 and the slidable plate 13 rests upon and slides in contact relation with the pawl.

The tooth 24 projects into the cavity 17 to engage the teeth 18.

When the slidable member 13 is moved endwise and toward the pawl the inclined surfaces of the ratchet teeth 18 engage the pawl to move it in opposition to the force applied by reason of its resiliency, thus the pawl is moved to permit the teeth to pass. An opposite movement or pull upon the slidable member 13 is prevented by the straight sides of the ratchet teeth.

For the purpose of releasing the pawl 22 a slide or push-plate 26 is provided and arranged to move in the recess 20. This push-plate has an inclined surface 27 at one end to engage with the inclined surface 23 of the pawl 22. The resiliency of the pawl causes its inclined surface to bear upon the inclined surface of the push plate and force it to a normally removed position permitting the operation of the pawl, that is, the pawl by reason of its resiliency is normally self-acting to engage with the teeth of the ratchet. The push-plate 26 is, however, provided at its other end with a boss 27' arranged adjacent to one end of the guide plate 10 and in operative relation to an extending end 28 of a link 29 which is hinged at 31 to an end of the guide plate 10. A cut out portion 32 is provided to accommodate the boss 27' when the foldable elements are closed.

The push-plate is provided with an end portion 30 which extends beyond the end of the guide plate 10. The purpose of the end portion 30 and the boss 27' will be hereinafter described.

A suitable stop may be provided to prevent the removal of the guide plate and as shown the ears 19 serve to engage one edge of the slide plate when moved in one direction, and the boss 27 acts as a stop when the slide plate is moved in opposite direction.

The bracelet section 16 may be secured to the slidable member 13 and the link 29 may have another link 33 hingedly connected therewith and to this latter link may be connected the other section 34 of the bracelet. When the links are folded together or in closed relation, the edges of link 33 snap under detents 35 formed by depressions in the lateral flanges 11 of the guide plate 10. The links when folded are disposed to cover the slide plate 13 which moves between the folded links and the push plate 26 and pawl 22 which two latter elements are movable in the recess 20 thus making a compact and symmetrical adjustable connector.

As above pointed out, connector members in the form of foldable links have been used to considerable extent and are so constructed and proportioned that when the links are open, the watch bracelet sections and the open connector constitute a closed ring which may be slipped over the wrist. The links when folded may, if the proportions are right, properly fit the wrist. Owing to variations in the perimeters of different wrists it has been the practice to provide an adjustable link in the form of a slidable member. This member when extended permits the bracelet to be opened to a slightly greater degree but the increase is so slight as not to be of any great importance insofar as increasing the diameter of the open bracelet is concerned.

When a watch with a bracelet having the present connector incorporated therewith is to be applied to the wrist the links are opened and the bracelet is slipped over the hand. If the hand is large and the bracelet opens to such an extent that the foldable links when open lie in substantially a straight line then the end 28 of the link 29 engages the boss 27' and forces the push rod 26 against the pawl 22 forcing it laterally, removing the tooth 24 from engagement with the teeth 18.

This leaves the slide 13 free to move and any force applied to the bracelet causes the slide to extend slightly thus enlarging the opening through which the hand is inserted. If the hand is not of sufficient size to straighten out the links then the slide is not released and remains engaged with the pawl. When the links are folded to close the bracelet the slide 13 may be in any position and if the wrist is too large this condition will be readily observed by the user who may then release the slide by gripping one end of the guide plate 10 with the one finger and the projecting end 30 of the push plate 26 with another finger.

Pressure on the end 26 causes the push-plate to move the pawl 22 and release the slide 13 permitting it to extend. If it is pulled out too far it may be moved inwardly since when the push-plate is released the self-acting pawl again engages the teeth. It often happens when using a take-up of the pawl and ratchet type, the user unintentionally moves the slide too much making the bracelet too tight.

As above mentioned it was heretofore necessary to open the links to release the slide whereas in the present construction this release may be effected while the links are closed by merely pressing the push-plate.

As shown in Fig. 4 of the drawing the connector may be closed and by gripping one end of the guide plate with one finger and pressing on the push plate with the thumb, the self-acting pawl is rendered inoperative and the slide-plate is free to move in or out at the will of the user. To remove the connector the folded links are lifted by means of the extensions 30 thus raising the guide-plate away from the folded links which are then free to open. In normal operation to open the connector, pressure is applied endwise on the extension 30 thus the pawl is moved from engagement with the teeth and as the connector is pulled away from the wrist to open the links the slide-plate 13 takes its outer position. When the extension 30 is released the pawl becomes active so that even when the links are open the pawl and ratchet are in operative relation. When the links are positioned in a substantially rectilinear arrangement the pawl is released but before the links are snapped closed the pawl engages the teeth so that an adjustment may be made if desirable prior to the operation of locking the folded links in their closed positions.

From the foregoing it will be evident that the present invention provides a simple and effective construction which may be manufactured at low cost and with a minimum amount of moving parts, giving simplicity and ruggedness.

Although a preferred embodiment of the invention is shown and described herein, it is to be understood that modifications may be made thereto without departing from the spirit and scope of the appended claims.

What is claimed is:

1. An adjustable connector for a bracelet comprising two slidable members arranged to slide endwise one upon the other, a folding member, a hinge connecting the folding member to one of the sliding members, said folding member connecting one end of the bracelet to the sliding members, a self-acting gripper member operative when one of said members is moved endwise to hold said slidable members in adjusted positions and a cam movable about said hinge for actuating said gripper member when said folding member is opened to release said self-acting gripper member whereby said slidable members have free movement.

2. An adjustable connector for a bracelet comprising two slidable members connected to slide endwise one upon the other, a folding member, pivotal means connecting the folding member to one of the sliding members, said folding member connecting one end of the bracelet to the sliding members, self-acting means operative when one of said members is moved endwise to hold said slidable members in adjusted positions, lateral guides on one of said slidable members, a pushbar movable in said guides for engagement with said self-acting member whereby said slidable members have free movement and a member carried by said pivotal means for disengaging said self-acting member when said folding member is unfolded.

3. An adjustable connector for a bracelet, comprising a guide-plate, a slidable member movable endwise in said plate, a foldable member pivotally connected to said plate and arranged when folded to seat on said plate, a spring member on said plate and a movable member on said guide plate for engaging and releasing said spring member to hold said slidable member in adjusted positions relative to said guide plate and means movable about the pivot of said foldable member to actuate said movable member to render said spring member inoperable when said foldable member is opened.

4. An adjustable connector for a bracelet comprising a guide plate, one section of a bracelet hingedly connected to one end of and foldable over said plate, a slide plate movable in said guide plate, another bracelet section connected to one end of said slide plate, a plurality of teeth on said slide plate, a pawl normally engaging said teeth, and a cam member movable about said hinge connection for disengaging said pawl and teeth when said first named section is in an unfolded position.

5. An adjustable connector for a bracelet comprising a guide plate, a member hingedly connected to one end of and foldable over said plate, a slide plate movable in said guide plate, another bracelet section connected to one end of said slide plate, a plurality of teeth on said slide plate, a pawl normally engaging said teeth, a release member movable in said guide plate for disengaging said pawl and teeth when said first member is folded over said plate, means extending from one end of said guide plate to be actuated by the user to apply pressure endwise to move said release member and a lateral extension movable about said hinge for actuating said pawl to release said teeth when said first mentioned member and plate are unfolded.

6. An adjustable connector for a bracelet, comprising a guide plate, a slidable member movable endwise in said plate, a foldable member, a hinge for pivotally connecting said foldable member to said plate said foldable member arranged when folded to seat on said plate, a spring member on said plate and means on said slidable member for engaging said spring member to hold said slidable member in adjusted positions relative to said guide plate and a lateral extension on said hinge and movable about the pivot point of said foldable member to render said spring member inoperable when said foldable member is unfolded.

7. A connector for a wrist watch strap comprising a housing, a member pivotally connected to one end of said housing, an extension member slidable in said housing, a tooth on said member, a latch member for engaging said tooth, and a cam movable about the pivot point of said member for moving said latch to disengage said tooth when said first mentioned member is rocked about its pivot.

8. A connector for a wrist watch strap comprising a housing, a folding member pivotally connected to one end of said housing, an extension member slidable in said housing, teeth on said member, a latch member for engaging said teeth, a sliding member for engaging said latch member and means carried at the pivot point of said folding member for actuating said sliding member to release said latch member when said folding member is unfolded.

9. A connector for a wrist watch strap comprising a housing, a foldable member, a pivot point for said member at one end of said housing, a cam member at one end of said foldable member movable about said pivot point, an extension member, slidable in said housing, a plurality of teeth on said member, a self-actuating latch for engaging said teeth, said cam member operating when said foldable member is opened to disengage said latch from said teeth.

10. A connector for a wrist watch strap comprising a housing, a folding member, a pivot element connecting said member to one end of said housing, an extension member having teeth, a latch member for engaging said teeth to hold said extension member in an adjusted position when said folding member is closed, a projection movable about and extending from said pivot element to cause said latch to be disengaged from said teeth when said folding member is moved to an open position and means for actuating said latch member when said folding member is folded.

11. An adjustable connector for a bracelet comprising a guide plate, a slide plate movable in said guide plate, a self-acting pawl having one end secured to said guide plate, teeth on said slide plate engaged by said pawl, said pawl having an inclined surface at the free end thereof, a push plate having an oppositely inclined surface in contact with the inclined surface of said pawl, said pawl acting to normally move said push plate in one direction, said push plate operating when moved toward said pawl to move said free end laterally to remove the pawl from engagement with said teeth.

12. An adjustable connector for a bracelet comprising a guide plate, a slide plate movable in said guide plate, a self-acting pawl having one end secured to said guide plate, teeth on said slide plate engaged by said pawl, said pawl having an inclined surface at the free end thereof, a push plate having an oppositely inclined surface in contact with the inclined surface of said pawl, said pawl acting to normally move said push plate in one direction, said push plate having an end extending from one end of said guide plate to be engaged for the application of force to move said push plate to move said free end laterally to render said pawl inoperative.

13. In an extension device, a member, a second member hingedly connected thereto, means for releasably locking said second member in folded relation to said first member, an adjustment link slidably secured to said first member, cooperating means associated with said first member and said link engageable for selectively setting said link in desired longitudinal relation to said first member, and means dependent on movement of said second member to open position for positively moving said cooperating means out of cooperating relation.

14. In an extension device, a member, a second member hingedly connected thereto, a third member hingedly connected to said second member and releasably securable to said first member for retaining the members in folded relation, an adjustment link slidably secured to said first member, cooperating means associated with said first member and said link engageable for selectively setting said link in desired longitudinal relation to said first member, and means dependent on movement of said second member to open position for positively moving said cooperating means out of cooperating relation.

15. In an extension device, a top plate, a second member hingedly connected thereto, means for releasably locking said second member in folded relation to said top plate, an adjustment link slidably secured to said first member, a pawl associated with said top plate and ratchet teeth associated with said link engageable for selectively setting said link in desired longitudinal relation to said top plate, and means dependent on movement of said second member to open position for positively moving said cooperating means out of cooperating relation.

SAUL RITTER.